(12) United States Patent
Islam et al.

(10) Patent No.: US 10,863,484 B2
(45) Date of Patent: Dec. 8, 2020

(54) INDICATION OF RANDOM-ACCESS CHANNEL MSG3 RESOURCE DURATION VIA RANDOM-ACCESS CHANNEL MSG2

(71) Applicant: QUALCOMM Incorporated, San Diego, CA (US)

(72) Inventors: Muhammad Nazmul Islam, Edison, NJ (US); Junyi Li, Chester, NJ (US); Raghu Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/722,261

(22) Filed: Oct. 2, 2017

(65) Prior Publication Data

US 2018/0199332 A1 Jul. 12, 2018

Related U.S. Application Data

(60) Provisional application No. 62/444,145, filed on Jan. 9, 2017, provisional application No. 62/560,080, filed on Sep. 18, 2017.

(51) Int. Cl.
| | |
|---|---|
| *H04W 4/00* | (2018.01) |
| *H04W 72/04* | (2009.01) |
| *H04W 74/08* | (2009.01) |
| *H04W 74/00* | (2009.01) |
| *H04L 5/00* | (2006.01) |
| *H04W 48/10* | (2009.01) |
| *H04W 52/14* | (2009.01) |

(Continued)

(52) U.S. Cl.
CPC ..... *H04W 72/0413* (2013.01); *H04W 74/006* (2013.01); *H04W 74/0833* (2013.01); *H04L 5/0048* (2013.01); *H04L 5/0078* (2013.01); *H04W 48/10* (2013.01); *H04W 52/146* (2013.01); *H04W 52/325* (2013.01); *H04W 52/50* (2013.01); *H04W 72/0446* (2013.01)

(58) Field of Classification Search
CPC .......... H04W 72/0413; H04W 52/146; H04W 74/006; H04W 74/0833; H04W 48/10; H04W 72/0446
See application file for complete search history.

(56) References Cited

U.S. PATENT DOCUMENTS

| 8,325,755 B2 | 12/2012 | Lee et al. | |
|---|---|---|---|
| 10,104,627 B2 * | 10/2018 | Choi | H04W 74/0833 |
| 2007/0064665 A1 | 3/2007 | Zhang et al. | |

(Continued)

FOREIGN PATENT DOCUMENTS

WO 2016040290 A1 3/2016

OTHER PUBLICATIONS

International Search Report and Written Opinion—PCT/US2018/012402—ISA/EPO—dated May 25, 2018.

(Continued)

*Primary Examiner* — Abdelnabi O Musa
(74) *Attorney, Agent, or Firm* — Arent Fox LLP

(57) ABSTRACT

In one aspect, a method, a computer-readable medium, and an apparatus for wireless communication are provided. The apparatus may be a base station. The apparatus may determine a duration of an uplink message that is to be sent from a UE. The apparatus may inform the UE regarding the duration of the uplink message through a random-access response message.

24 Claims, 16 Drawing Sheets

(51) Int. Cl.
*H04W 52/32* (2009.01)
*H04W 52/50* (2009.01)

(56) References Cited

U.S. PATENT DOCUMENTS

| | | |
|---|---|---|
| 2007/0147326 A1 | 6/2007 | Chen |
| 2007/0291696 A1 | 12/2007 | Zhang et al. |
| 2008/0232283 A1* | 9/2008 | Jen ................... H04W 74/006 370/310 |
| 2009/0168750 A1 | 7/2009 | Pelletier et al. |
| 2013/0294310 A1* | 11/2013 | Yi .................... H04W 74/002 370/311 |
| 2015/0173105 A1* | 6/2015 | Bergstrom ......... H04W 74/006 370/329 |
| 2016/0119958 A1* | 4/2016 | Tan .................. H04W 74/002 370/336 |
| 2016/0227582 A1 | 8/2016 | Vajapeyam et al. |
| 2017/0019930 A1* | 1/2017 | Lee .................. H04W 74/0833 |
| 2017/0231011 A1* | 8/2017 | Park ................. H04W 72/0446 |
| 2017/0273113 A1 | 9/2017 | Tirronen et al. |
| 2018/0035470 A1 | 2/2018 | Chen et al. |
| 2018/0054837 A1* | 2/2018 | Islam ............... H04W 74/0833 |
| 2018/0255575 A1* | 9/2018 | Yu .................... H04W 74/08 |
| 2019/0387548 A1 | 12/2019 | Kim |

OTHER PUBLICATIONS

ZTE Microelectronics: "Unified RACH Procedure," 3GPP Draft; R1-1611273, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016, XP051175254, Retrieved from the Internet: URL: http://www.3gpp.org/ftp/Meetings_3GPP_SYNC/RAN1/Docs/ [retrieved on Nov. 13, 2016].

Samsung: "RAR/Msg3/Msg4 Transmission for Low Cost UEs", 3GPP TSG RAN WG1 #81, R1-152841, XP050968335, Fukuoka, Japan, May 15, 2015, 3 Pages, 20150525-20150529.

* cited by examiner

INDICATION OF RANDOM-ACCESS CHANNEL MSG3 RESOURCE DURATION VIA RANDOM-ACCESS CHANNEL MSG2

CROSS-REFERENCE TO RELATED APPLICATIONS

This application claims the benefit of U.S. Provisional Application Ser. No. 62/444,145, entitled "INDICATION OF MSG3 RESOURCE DURATION VIA MSG2" and filed on Jan. 9, 2017, which is expressly incorporated by reference herein in its entirety. This application also claims the benefit of U.S. Provisional Application Ser. No. 62/560,080, entitled "INDICATION OF MSG3 RESOURCE DURATION VIA MSG2" and filed on Sep. 18, 2017, which is expressly incorporated by reference herein in its entirety.

BACKGROUND

Field

The present disclosure relates generally to communication systems, and more particularly, to indicating a duration of a random-access channel (RACH) message 3 (Msg3) using a RACH message 2 (Mgs2).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In millimeter wave (mmW) systems, a directional RACH (DRACH) may be used for initial network access. A base station may sweep across different directions in different time slots and wait to receive a RACH signal from one or more user equipments (UEs). The RACH duration may depend on a UE with the weakest link gain. Thus, the overhead for the RACH may be high.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

RACH duration may depend on the UE with the weakest link gain. Thus, the overhead for RACH may be high. In an aspect of the disclosure, a method, a computer-readable medium, and an apparatus are provided to reduce overhead at the expense of increasing latency for UEs with weak link gain, while latency for most UEs may remain the same. The apparatus may be a UE. The apparatus may transmit a RACH preamble to a base station in one or more attempts. The apparatus may receive, through a RACH Msg2 from a base station, information regarding a duration of a RACH Msg3. The apparatus may transmit the RACH Msg3 over the duration. In one configuration, the RACH Msg3 may be transmitted over at least one mini-slot or at least one slot, and the duration may be defined by a number of symbols in the at least one mini-slot or the at least one slot.

In another aspect of the disclosure, a method, a computer-readable medium, and an apparatus for wireless communication are provided. The apparatus may be a base station. The apparatus may determine a duration of an uplink message that is to be sent from a UE. The apparatus may inform the UE regarding the duration of the uplink message through a random-access response message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
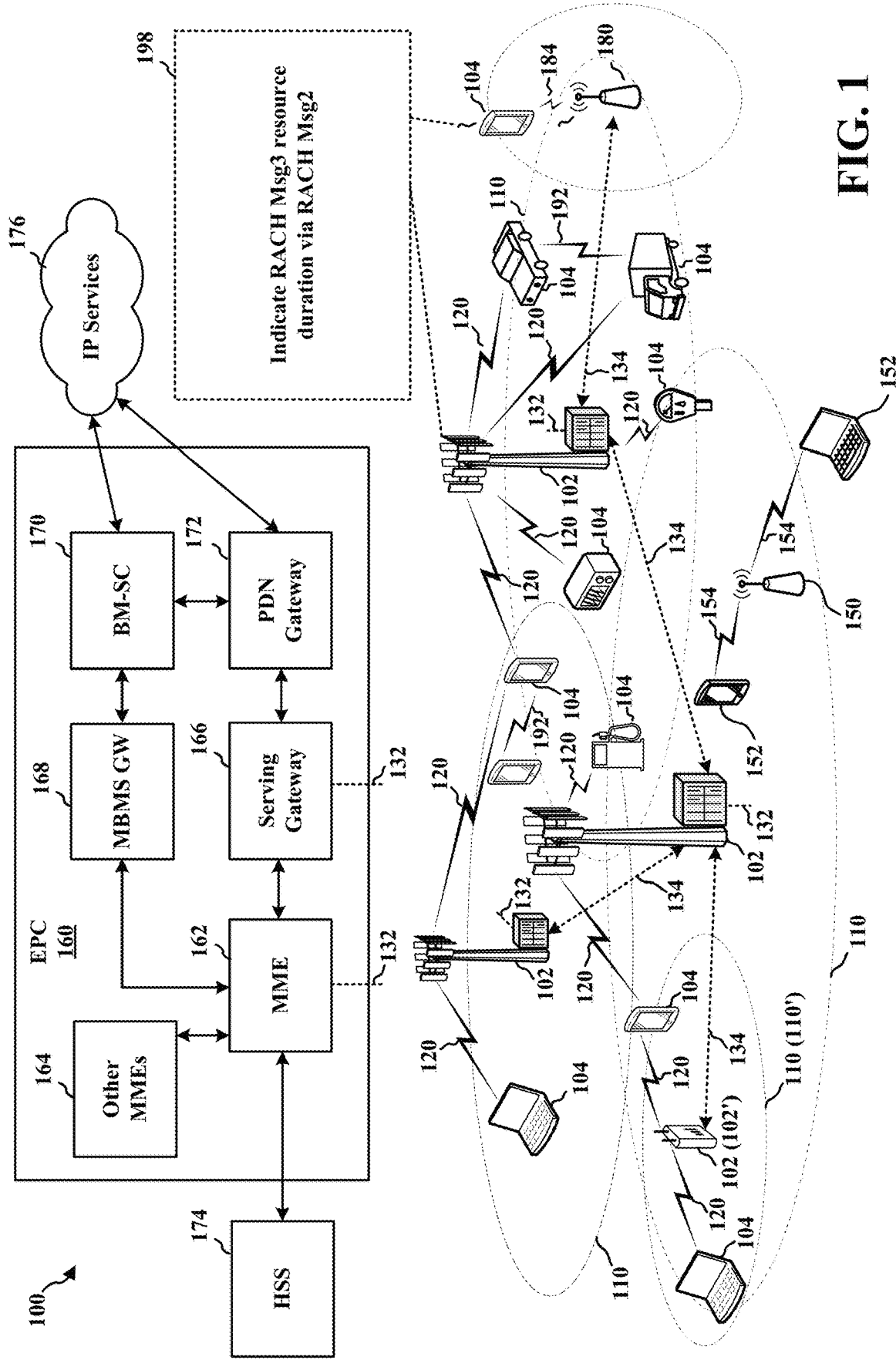
FIG. 1 is a diagram illustrating an example of a wireless communications system and an access network.
Figure 2:
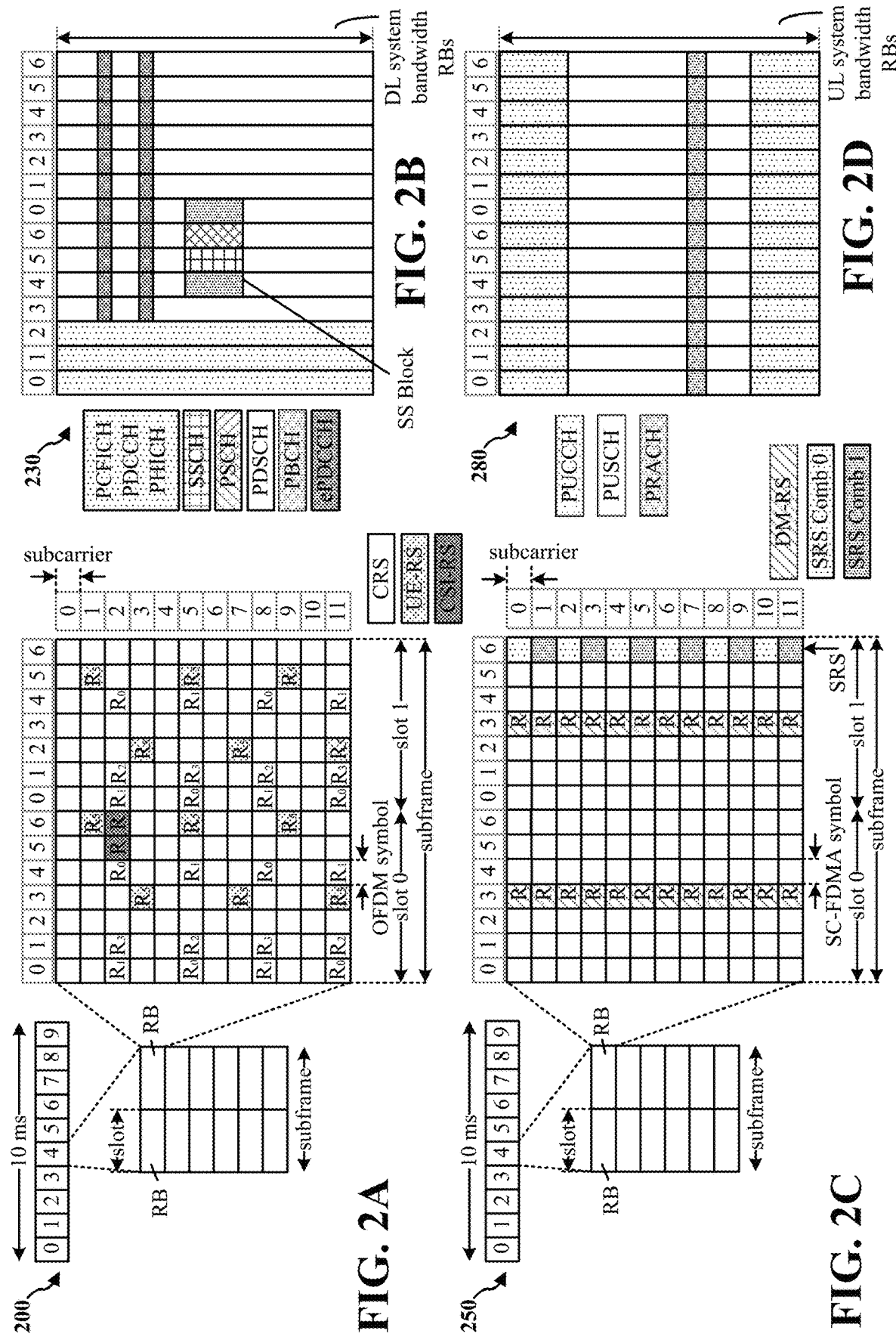
FIGS. 2A, 2B, 2C, and 2D are diagrams illustrating LTE examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, eNB, an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 102 may be configured to indicate (at 198) RACH Msg3 resource duration via RACH Msg2. The operations performed at 198 will be further described below with reference to FIGS. 2-16.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
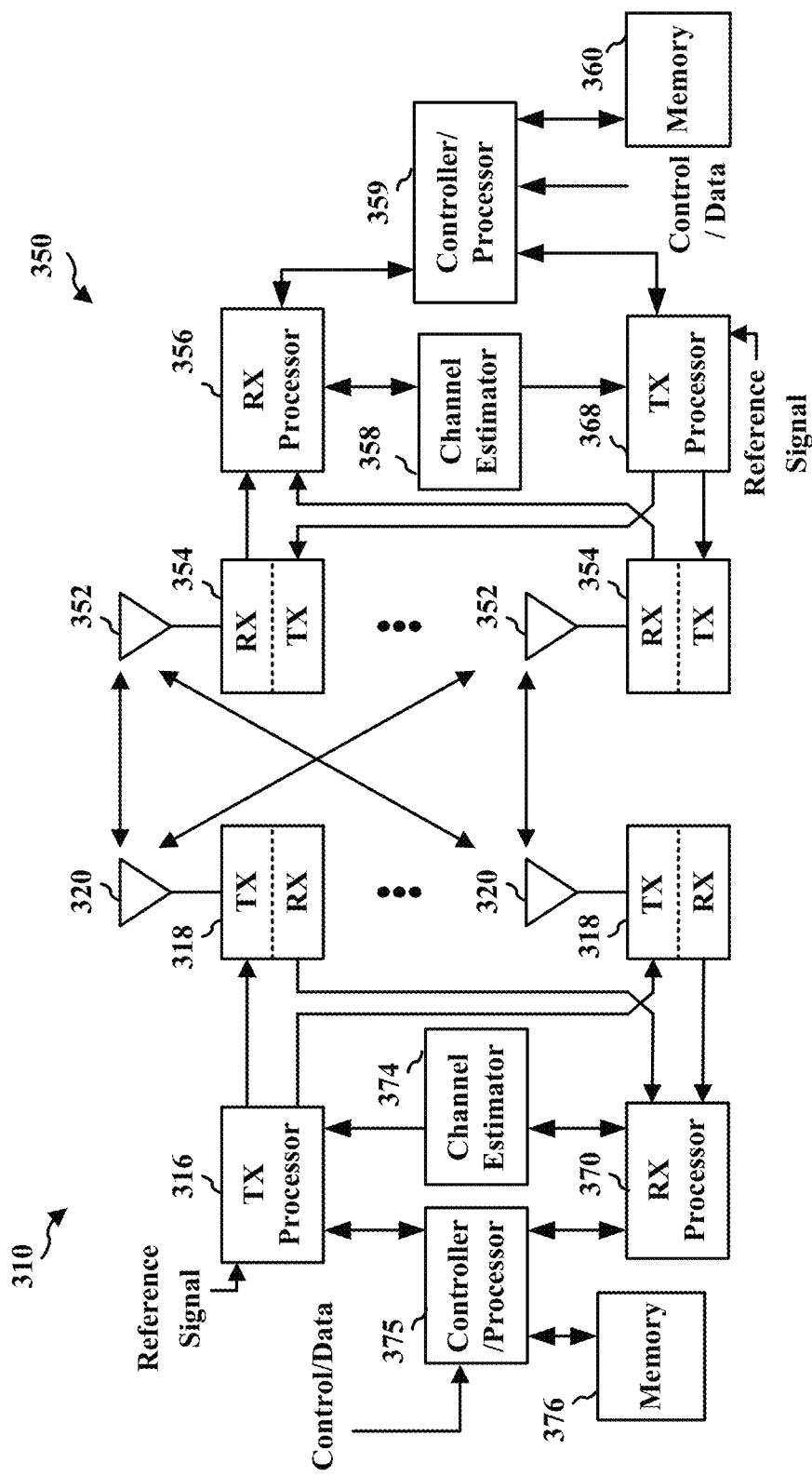
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In LTE, a RACH Msg2 may be used to schedule the resource(s) allocated for RACH Msg3 (e.g., RRC connection request, tracking area update, or scheduling request). In one configuration, the resource duration of Msg3 may last for one subframe, which may have fourteen symbols. In 5G NR, a subframe may be a unit of time (e.g., 1 ms), and the resource duration of Msg3 may last for at least one slot or at least one mini-slot. In one configuration, a slot may have seven or fourteen symbols. In one configuration, a mini-slot may have as few as one symbol.

Figure 4:
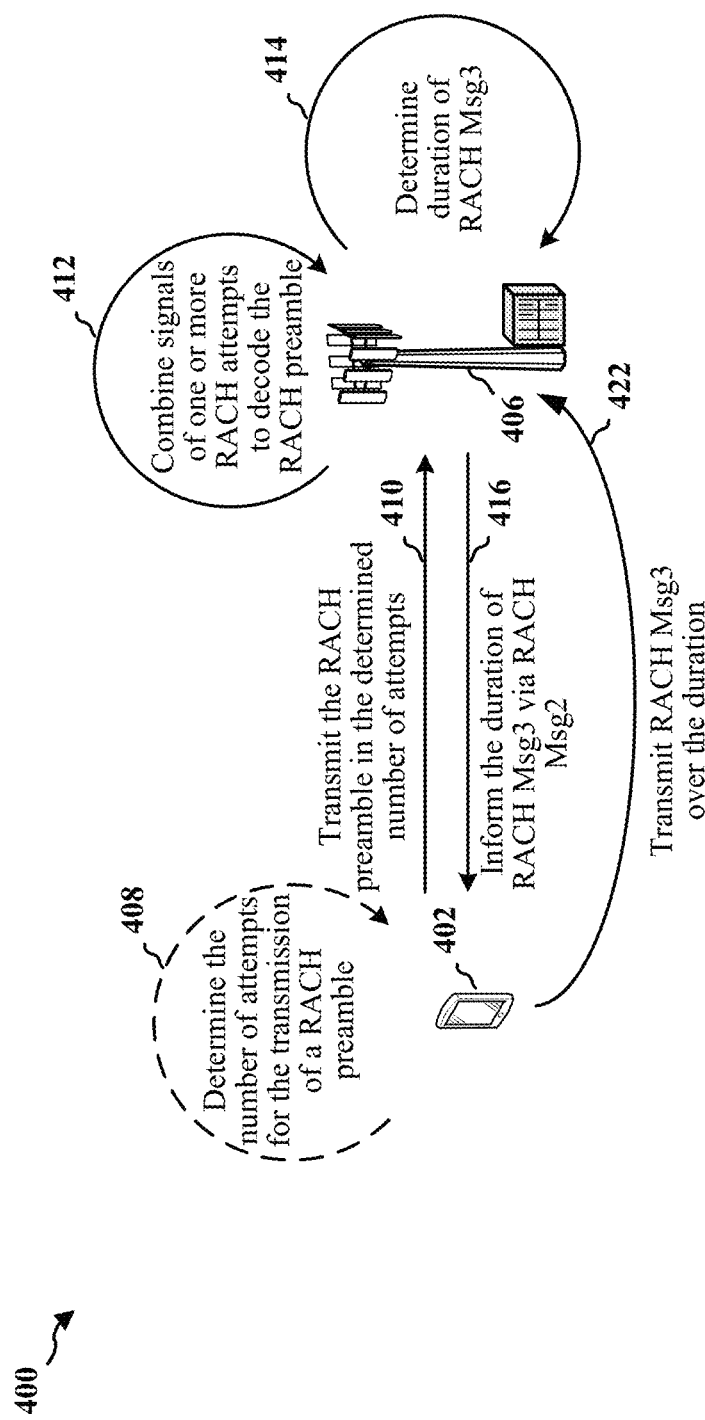
FIG. 4 is a diagram illustrating an example of RACH combining across multiple attempts in a wireless communication system.

FIG. 4 is a diagram illustrating an example of RACH combining across multiple RACH attempts in a wireless communication system 400. In one configuration, the wireless communication system 400 may be a mmW system. In the example illustrated in FIG. 4, the wireless communication system 400 includes a UE 402 and a base station 406. The UE 402 may correspond to, e.g., UE 104, 350, 1450, 1602, the apparatus 1102/1102'. The base station 406 may correspond to, e.g., base station 102, 180, 1150, 1606, the apparatus 1402/1402'. In one configuration, multiple RACH attempts may be transmitted in different subframes. In one configuration, multiple RACH attempts may be transmitted in different time slots, e.g., to convey multiple beam IDs to the base station 406. The different time slots may fall in different subframes or may fall in the same subframe. In one configuration, each RACH attempt may be made at a transmission time that may be denoted by a combination of one or more of a frame index, a subframe index, or a symbol index.

In one configuration, the UE 402 may optionally determine (at 408) the number of RACH attempts for the transmission of a RACH signal (e.g., the RACH preamble, a RACH message 1 (Msg1), etc.) based on one or more of path loss, configured transmit power of the UE 402, or the power of signals received during the synchronization subframe. In one configuration, for the UE 402, the transmit power of a RACH signal may be determined by $$P\_RACH = \min\{P\_C\ MAX(i), Preamble\_Received\_Target\_Power + PL\},$$

where

P_RACH is the transmit power of a RACH signal,

P_CMAX(i) is the configured UE transmit power for subframe

Preamble_Received_Target_Power may be the power level the base station (e.g., 406) would like to receive for RACH, and PL may be the downlink path loss estimate calculated by the UE (e.g., 402), e.g., based on the received power of the beam reference signal (BRS) signal associated with the selected beam.

In one configuration, the Preamble_Received_Target_Power may be estimated based on one or more of path loss, the transmit power of the UE 402, or the power of signals received during the synchronization subframe. In one configuration, if Preamble_Received_Target_Power+PL<P_CMAX(i), the UE 402 may transmit the RACH signal in one RACH attempt. If Preamble_Received_Target_Power+PL>=P_CMAX(i), but Preamble_Received_Target_Power+PL<=P_CMAX(i)+alpha (e.g., alpha=3 dB), the UE 402 may transmit the RACH signal in two attempts. If Preamble_Received_Target_Power+PL>P_CMAX(i)+alpha, but Preamble_Received_Target_Power+PL<=P_CMAX(i)+beta, the UE 402 may transmit the RACH signal in three attempts. If Preamble_Received_Target_Power+PL>P_CMAX(i)+beta, the UE may transmit the RACH signal in four or more attempts.

In one configuration, the values of alpha and beta may be configurable. In such a configuration, the base station (e.g., 406) may transmit the values of alpha and/or beta as a part of a system information block (SIB) to enable each UE 402 to determine the number of RACH attempts for transmitting a RACH signal.

The UE 402 may transmit (at 410) the RACH signal (e.g., the RACH Msg1 preamble) in the determined number of RACH attempts to the base station 406. For example, if the determined number of RACH attempts is one, the UE 402 may transmit the RACH signal in one RACH attempt. If the determined number of RACH attempts is two, the UE 402 may transmit the RACH signal in two RACH attempts. Examples of transmitting/receiving a RACH signal in multiple RACH attempts will be described below with reference to FIGS. 8 and 9.

The base station 406 may combine (at 412) signals of one or more RACH attempts to decode the RACH signal (e.g., the RACH Msg1 preamble). For example, the base station 406 may use a signal within a single RACH attempt to decode the RACH signal from a strong UE (e.g., the transmit power of the UE is greater than the summation of the RACH preamble received power and the path loss). The base station 406 may combine signals of two or more RACH attempts to decode the RACH signal from a weak UE (e.g., the transmit power of the UE is less than the summation of the RACH preamble received power and the path loss).

The base station 406 may determine (at 414) the duration of a RACH Msg3 (e.g., RRC connection request, tracking area update, or scheduling request) based on the number of decode attempts the base station 406 uses to decode the RACH preamble, and/or based on a signal strength of the RACH preamble (e.g., the RACH Msg1 preamble). In one configuration, the RACH Msg3 may be transmitted over at least one mini-slot or at least one slot, and the duration may be defined by a number of symbols in the at least one mini-slot or the at least one slot. For example, if the base station 406 uses one attempt to decode the RACH preamble, the mini-slot may include a first number of symbols, if the base station 406 attempts to decode the RACH preamble two times, the mini-slot may include a second number of symbols. In one configuration, the second number of symbols may be greater than the first number of symbols. In one configuration, the second number of symbols may be a multiple of the first number of symbols.

In one configuration, if the base station 406 attempts to decode the RACH preamble more than twice, the mini-slot may include a third number of symbols. In one configuration, the third number of symbols may be greater than the second number of symbols. In one configuration, the third number of symbols may be a multiple of the second number of symbols.

The base station 406 may inform (at 416) the UE 402 the duration of RACH Msg3 via RACH Msg2.

In one configuration, the UE 402 may transmit (at 422) the RACH Msg3 over the duration. For example, the duration may be defined by a mini-slot with a particular number of symbols, and the UE 402 may transmit the RACH Msg3 over the mini-slot.

Figure 5:
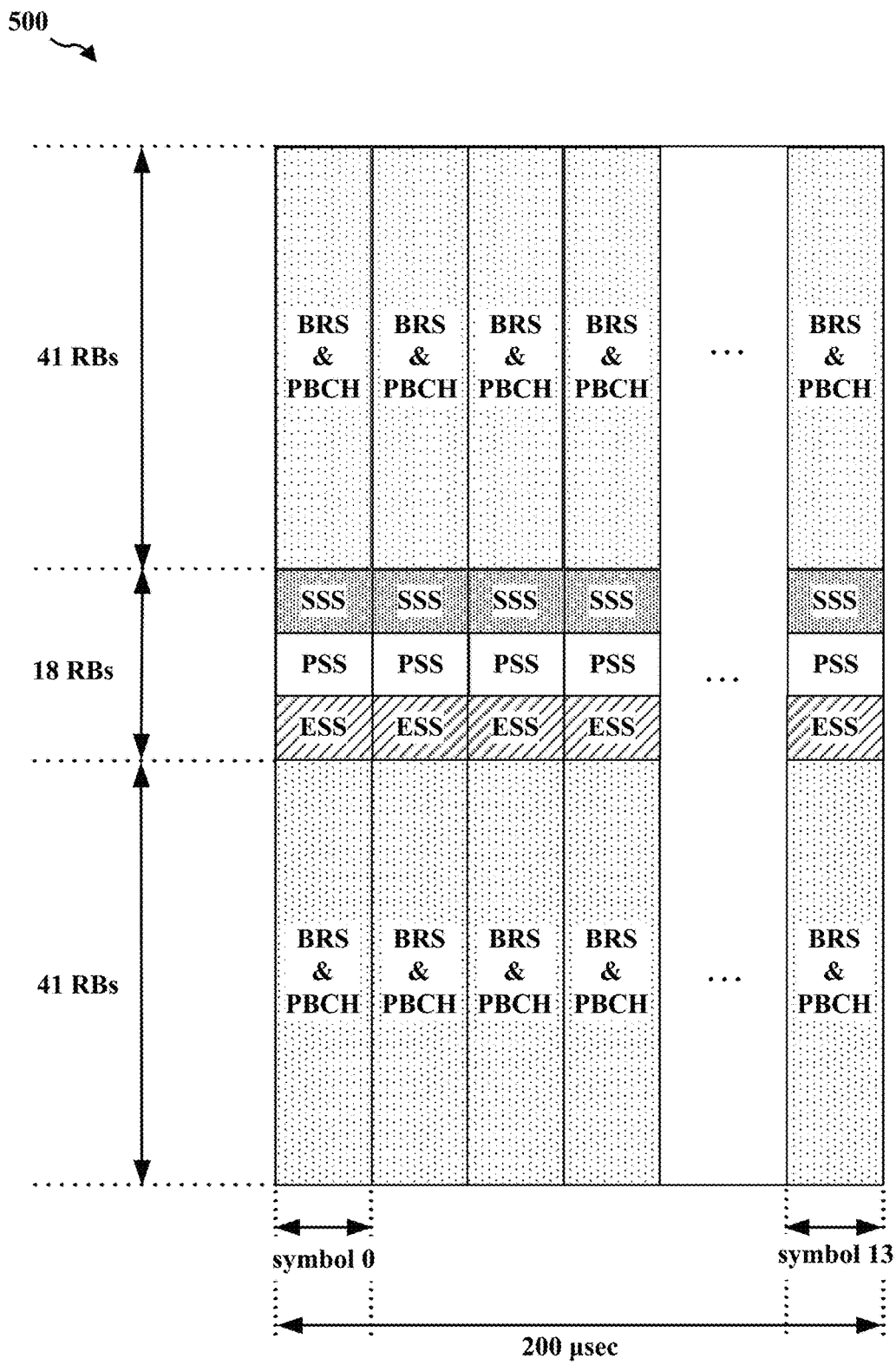
FIG. 5 is diagram illustrating an example of a synchronization subframe used in a wireless communication system.

FIG. 5 is diagram illustrating an example of a synchronization subframe 500 used in a wireless communication system (e.g., the wireless communication system 100, 400). In the example illustrated in FIG. 5, 1, 2, 4 or 8 antenna ports may be active. The beam of each antenna port may change from symbol to symbol within the synchronization subframe 500. A PSS, an extended synchronization signal (ESS), a SSS, and a PBCH may be transmitted by all antenna ports on the same subcarriers. A BRS may be transmitted by all antenna ports, but either on disjoint subcarriers or are code multiplexed. The contents of the ESS may change from symbol to symbol. Thus, a UE (e.g., the UE 104, 350, 402 1450, the apparatus 1102/1102') may identify a particular symbol within the synchronization subframe 500 based on the contents of the ESS.

Figure 6:
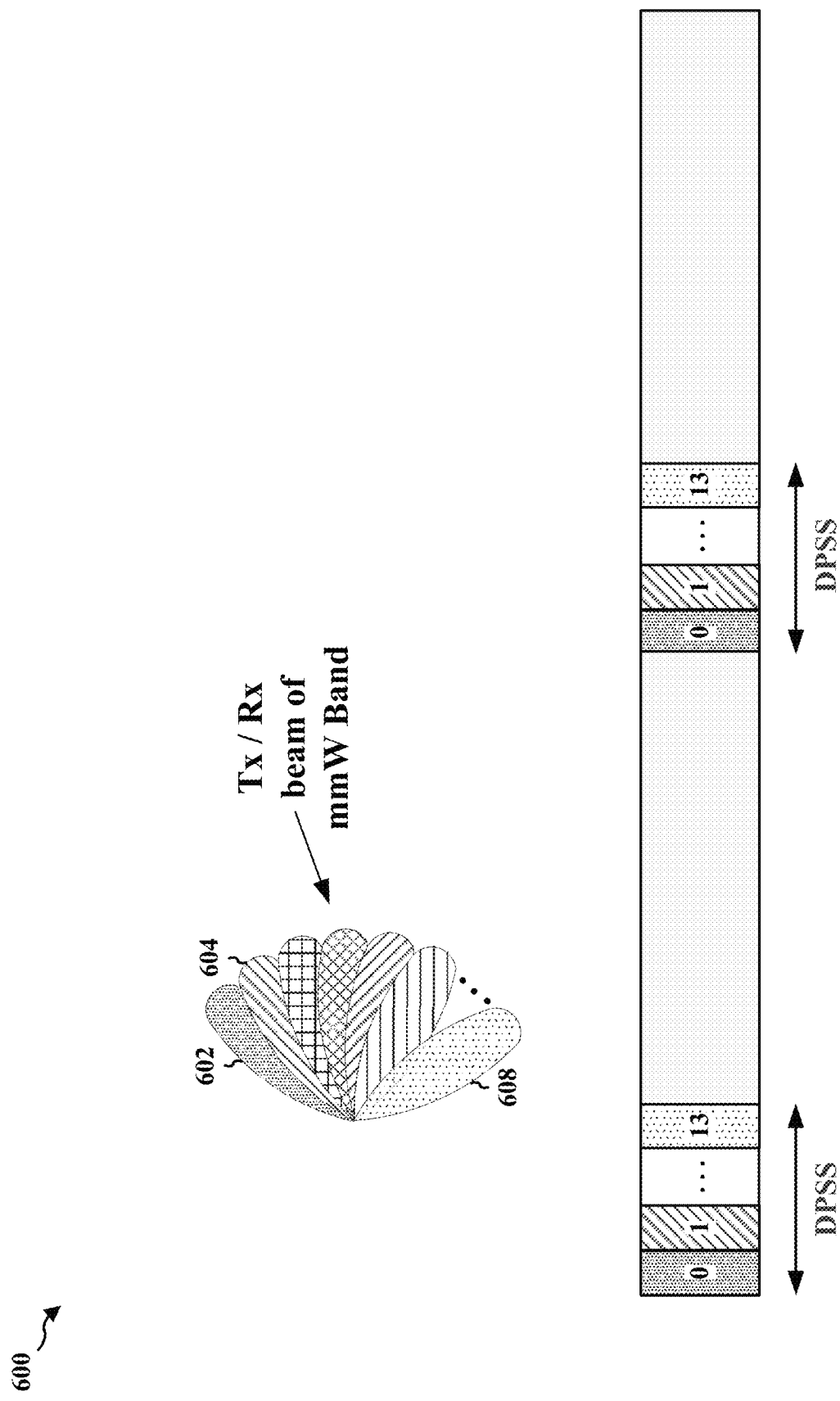
FIG. 6 is a diagram illustrating an example of directional PSS (DPSS) in a mmW system.

FIG. 6 is a diagram 600 illustrating an example of DPSS in a mmW system. In one configuration, the DPSS may be within the synchronization subframe 500 described above in FIG. 5. In FIG. 6, different TX/RX beam directions (e.g., 602, 604, . . . 608) of a mmW band are illustrated with different patterns. To enable the UE (e.g., the UE 104, 350, 402 1450, the apparatus 1102/1102') to learn useful TX/RX beam pairs and to overcome high path loss, beamforming may be used on RX and TX. The base station (e.g., the base station 102, 180, 406, 1150, the eNB 310, the apparatus 1402/1402') may send a PSS on several successive symbols but in different beam directions sweeping through the entire sector. For example, in each synchronization subframe, the PSS on symbol 0 may be in beam direction 602, the PSS on symbol 1 may be in beam direction 604, . . . , and the PSS on symbol 13 may be in beam direction 608. By sending the PSS in different beam directions, the UE may be able to select the best beam pair for TX/RX.

Figure 7:
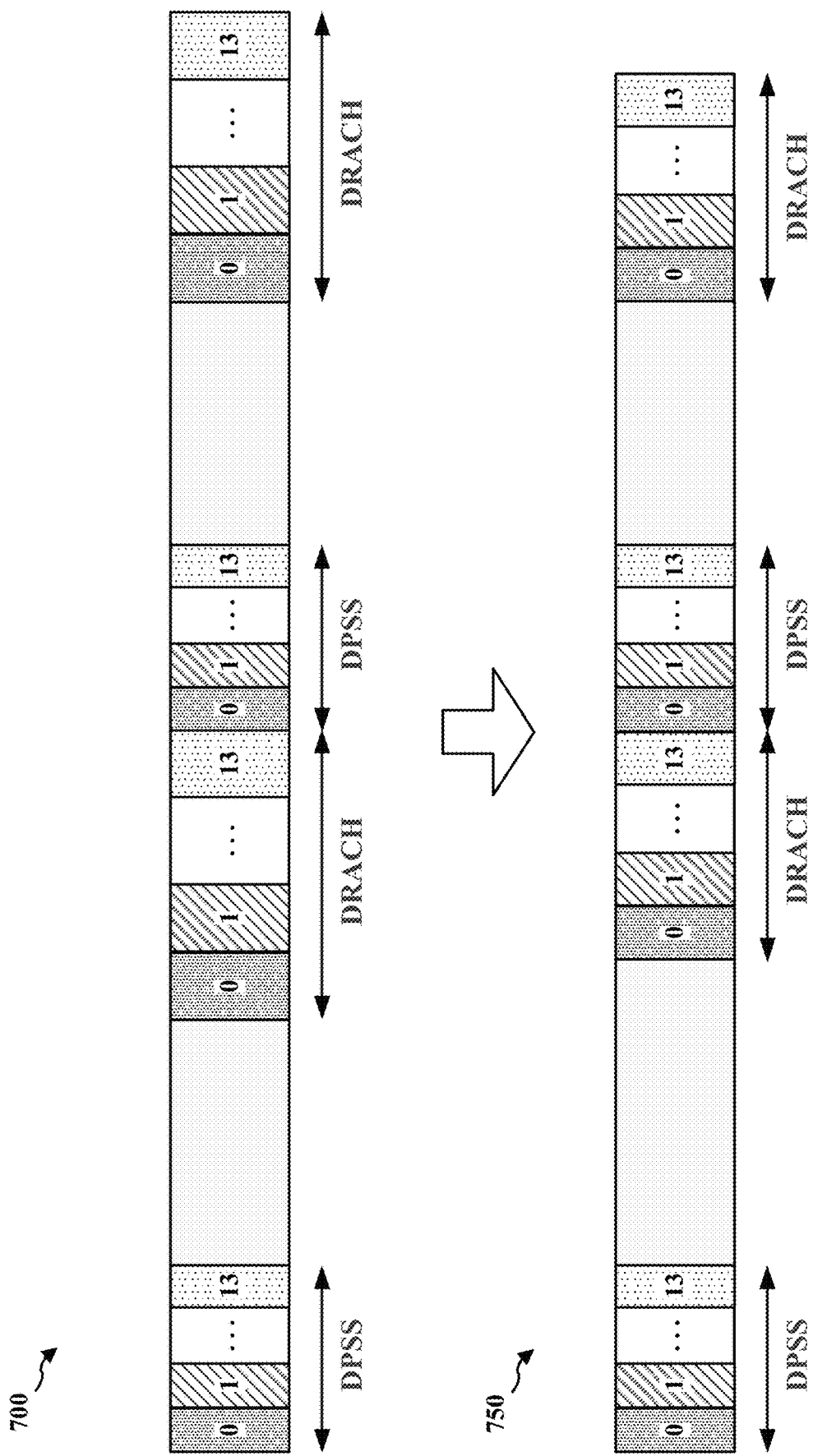
FIG. 7 illustrates an example of reducing the DRACH duration by using RACH combining across multiple attempts.

FIG. 7 illustrates an example of reducing the DRACH duration by using RACH combining across multiple RACH attempts. Specifically, diagram 700 shows the DRACH duration before using RACH combining across multiple RACH attempts, and diagram 750 shows the reduced DRACH duration after using RACH combining across multiple RACH attempts.

The UE (e.g., the UE 104, 350, 402 1450, the apparatus 1102/1102') may select the best beam based on the received DPSS and find corresponding timing to transmit a RACH signal (e.g., a RACH Msg1 preamble). In one configuration, the best beam may be the beam with the strongest signal and/or the least inference. In one configuration, the UE may select subcarrier region and cyclic shift randomly. As shown in diagram 700, the RACH duration depends on the UE with the weakest link gain. As the UE of the weakest link gain needs more time to transmit enough energy for the RACH signal to be detected by the base station (e.g., the base station 102, 180, 406, 1150, the eNB 310, the apparatus 1402/1402'), the RACH duration may be long, thus leading to high overhead.

In one configuration, using RACH combining across multiple RACH attempts may reduce RACH duration by a factor of two. UEs with good link gain may transmit the RACH in one RACH attempt. UEs with poor link gain transmit the RACH in two or more RACH attempts. The base station may maintain information associated with the energy received in one or more previous RACH attempts and combine received energy across two or more RACH attempts to provide better link budget for weak UEs.

Figure 8:
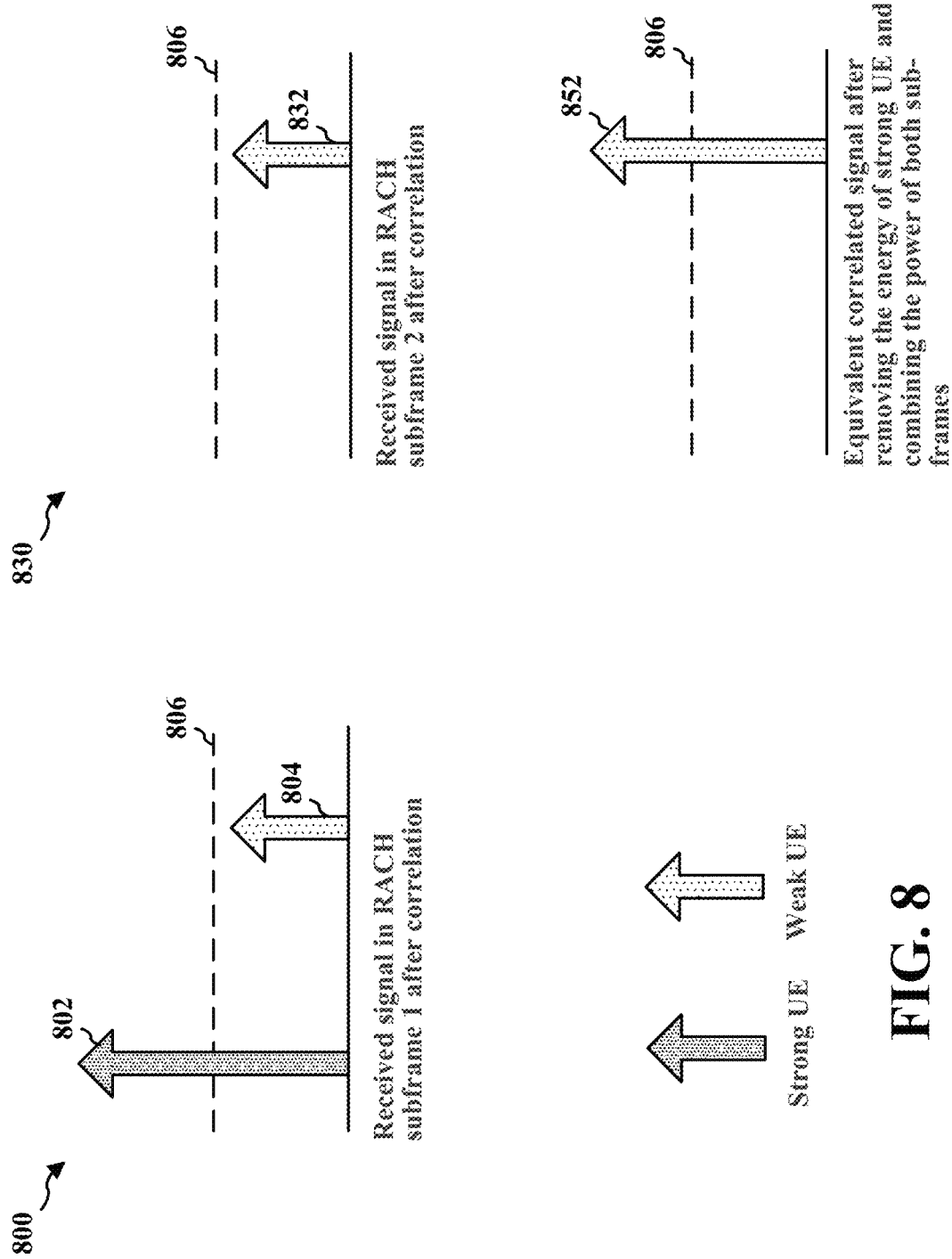
FIG. 8 is a diagram illustrating an example of combining signals of two RACH subframes to decode a RACH signal.

FIG. 8 is a diagram illustrating an example of combining signals of two RACH subframes to decode a RACH signal. At 800, the base station (e.g., the base station 102, 180, 406, 1150, the eNB 310, the apparatus 1402/1402') may receive a signal 802 from a strong UE (e.g., the UE 104, 350, 402 1450, the apparatus 1102/1102') and a signal 804 from a weak UE (e.g., the UE 104, 350, 402 1450, the apparatus 1102/1102') in RACH subframe 1. In one configuration, each of the signals 802 and 804 may convey at least a portion of the RACH preamble from the respective UE. A power threshold level 806 indicates the threshold level of power in a signal after correlation of the signal with a predefined RACH preamble in order for the base station to detect the signal. Because the signal 802 exceeds the power threshold level 806 after correlation, and the signal 804 does not exceed the power threshold level 806 after correlation, the base station may be able to detect the signal 802 from the strong UE but not the weak UE. In one configuration, the base station may determine the total power of the RACH subframe 1 after correlation, and subtract the correlated power corresponding to the signal 802 to obtain an updated power of RACH subframe 1. In one configuration, the base station may transmit a RACH Msg2, i.e., a random access response message of a contention based random access procedure, to the corresponding beam direction to convey whether or not the base station has decoded the RACH preamble in one subframe. Upon reception of the RACH Msg2, the weak UE may realize that the base station decoded a strong UE's RACH signal because the base station was unable to decode the weak UE's signal in one RACH subframe.

At 830, the base station may receive a signal 832 from the weak UE in RACH subframe 2. The base station may determine the power in RACH subframe 2 after correlation, and add the power determined in RACH subframe 2 to the updated power of RACH subframe 1. After addition, a signal 852 may be obtained. The signal 852 may be an equivalent correlated signal after removing the energy of the strong UE and combining the power of RACH subframes 1 and 2. The signal 852 may exceed the power threshold level 806. Thus, the signal 852 of the weak UE may be detected by the base station.

Figure 9:
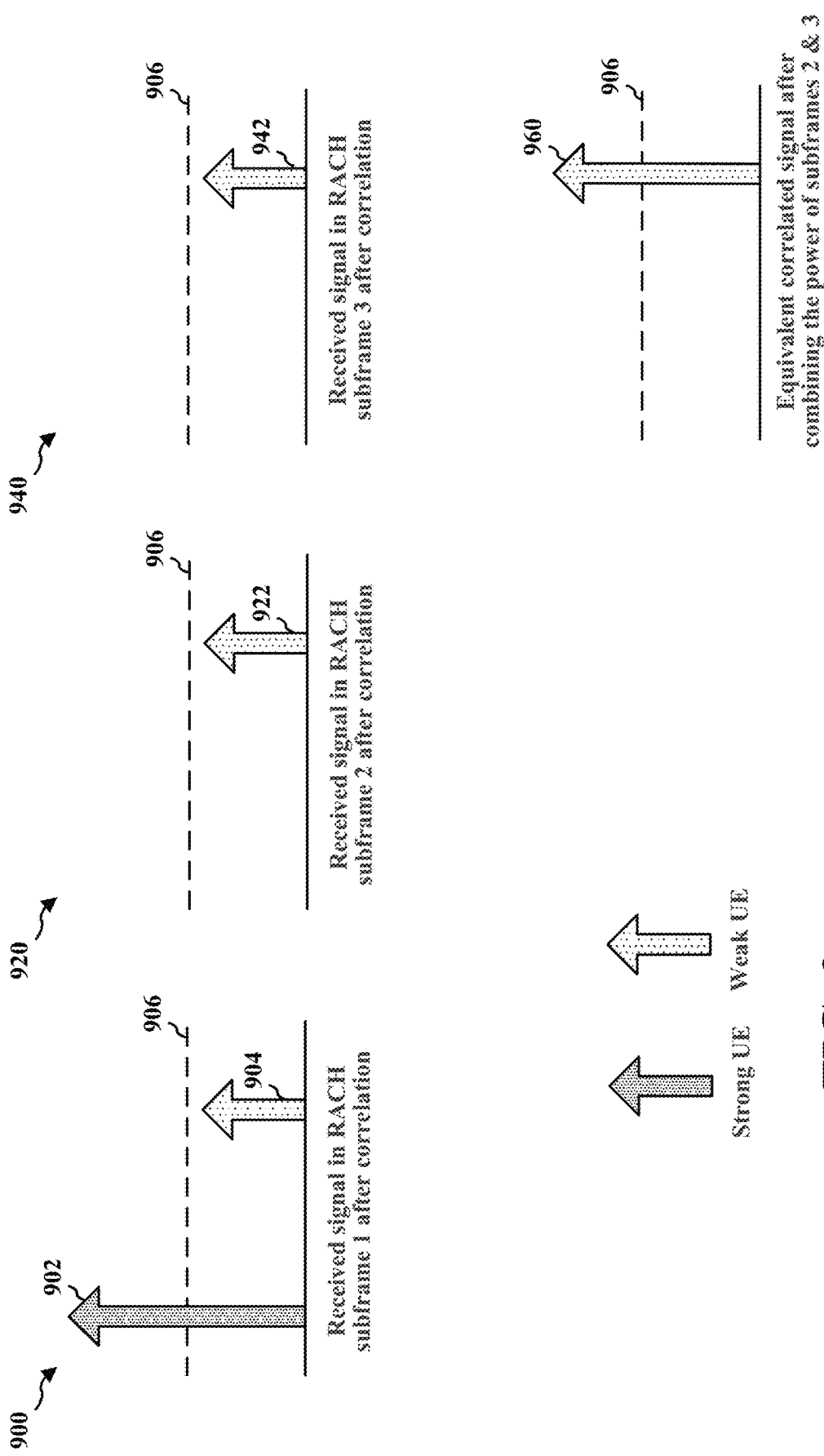
FIG. 9 is a diagram illustrating another example of combining signals of two RACH subframes to decode a RACH signal.

FIG. 9 is a diagram illustrating another example of combining signals of two RACH subframes to decode a RACH signal. At 900, the base station (e.g., the base station 102, 180, 406, 1150, the eNB 310, the apparatus 1402/1402') receives a signal 902 from a strong UE (e.g., the UE 104, 350, 402 1450, the apparatus 1102/1102') and a signal 904 from a weak UE (e.g., the UE 104, 350, 402 1450, the apparatus 1102/1102') in RACH subframe 1. In one configuration, each of the signals 902 and 904 may convey the RACH preamble (e.g., RACH Msg1 preamble) from the respective UE. A power threshold level 906 indicates the threshold of power in a signal after the signal gets correlated with a RACH preamble in order for the base station to detect that signal. Because the signal 902 exceeds the power threshold level 906 after correlation and the signal 904 does not exceed the power threshold level 906 after correlation, the base station may be able to detect the signal 902 from the strong UE but not the signal 904 from the weak UE. In one configuration, the base station may ignore the remaining power of the RACH subframe 1. In one configuration, the base station may transmit a RACH message 2, e.g., a random access response message of contention based random access procedure, to the corresponding beam direction to convey whether or not the base station has decoded the RACH preamble in one subframe. Upon reception of the RACH message 2, the weak UE may determine that the base station decoded a strong UE's RACH signal because the base station is unable to decode the weak UE's signal in one RACH subframe. The weak UE may determine that the RACH signal may need to be transmitted in two subsequent subframes so that the base station is able to decode the RACH signal from the weak UE.

At 920, the base station may receive a signal 922 from the weak UE in RACH subframe 2. At 940, the base station may receive a signal 942 from the weak UE in RACH subframe 3. Neither the signal 922 nor the signal 942, after being correlated with the RACH preamble, exceeds the power threshold level 906. The base station may non-coherently combine the power of subframes 2 and 3 and obtain an equivalent correlated signal 960 for the weak UE, which exceeds the power threshold level 906. Thus, the base station may be able to detect the weak UE's signal by correlating the received signal with the RACH preamble and then combining the power of the correlated signals of subframes 2 and 3. In one configuration, non-coherently combining of two correlated signals may mean the base station does not need the phase information of the correlated signals to combine the signals. In one configuration, non-coherently combining may mean combining the amplitude of the correlated signals/power.

Figure 10:
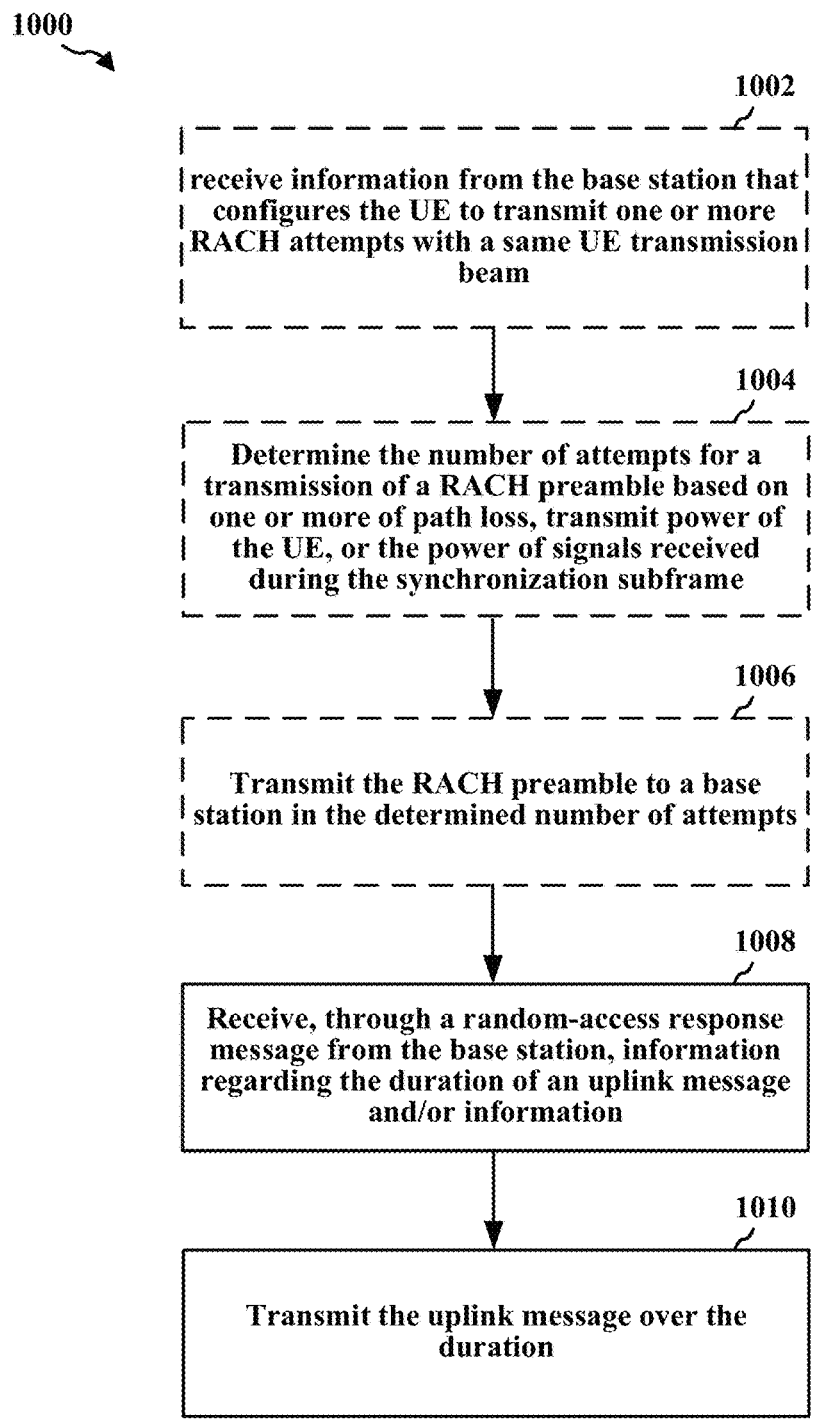
FIG. 10 is a flowchart of a method of wireless communication.

FIG. 10 is a flowchart 1000 of a method of wireless communication. The method may be performed by a UE (e.g., the UE 104, 350, 402, the apparatus 1102/1102') in communication with a base station (e.g., the base station 102, 180, 406, 1150, the eNB 310, the apparatus 1402/1402D. In FIG. 10, optional operations are indicated with dashed lines.

At 1002, the UE may receive information from the base station that configures the UE to transmit one or more RACH attempts with a same UE transmission beam. In certain configurations, the operations performed at 1002 may include one or more of the operations described below with reference to FIG. 16.

At 1004, the UE may determine the number of attempts for a transmission of a RACH signal (e.g., the RACH Msg1 preamble) based on one or more of path loss, the configured transmit power of the UE, or the power of signals received during a synchronization subframe. In one configuration, the operations performed at 1004 may be the operations described above with reference to 408 of FIG. 4. In one configuration, multiple RACH attempts may be transmitted in different subframes. In one configuration, multiple RACH attempts may be transmitted in different time slots, e.g., to convey multiple beam IDs to the base station. The different time slots may be in different subframes or may be in the same subframe. In one configuration, each RACH attempt may be made at a transmission time that may be denoted by a combination of one or more of a frame index, a subframe index, or a symbol index.

In one configuration, to determine the number of RACH attempts to use the UE may estimate the RACH preamble received power based on one or more of the path loss, the transmit power of the UE, or the power of the signals received during the synchronization subframe. In such a configuration, the number of RACH attempts may be determined based on one or more of the path loss, the transmit power of the UE, or the RACH preamble received power.

In one configuration, the determined number of attempts may be one when the configured transmit power of the UE is greater than the summation of the RACH preamble received power and the path loss. In one configuration, the determined number of attempts may be more than one when the configured transmit power of the UE is less than the summation of the RACH preamble received power and the path loss. In one configuration, the path loss may be determined based on a received signal (e.g., the BRS signal) during a synchronization subframe. In one configuration, the path loss may be determined individually for each of the multiple beams transmitted during a synchronization subframe. In one configuration, the configured transmit power of the UE and the RACH preamble received power may be received from a base station during in a SIB transmitted by the base station. In one configuration, the UE may receive several threshold parameters (e.g., alpha, beta described above with reference to FIG. 4) from the base station in the received SIB that may allow the UE to determine the number of RACH attempts that the base station may need for decoding a RACH signal from the UE.

Figure 16:
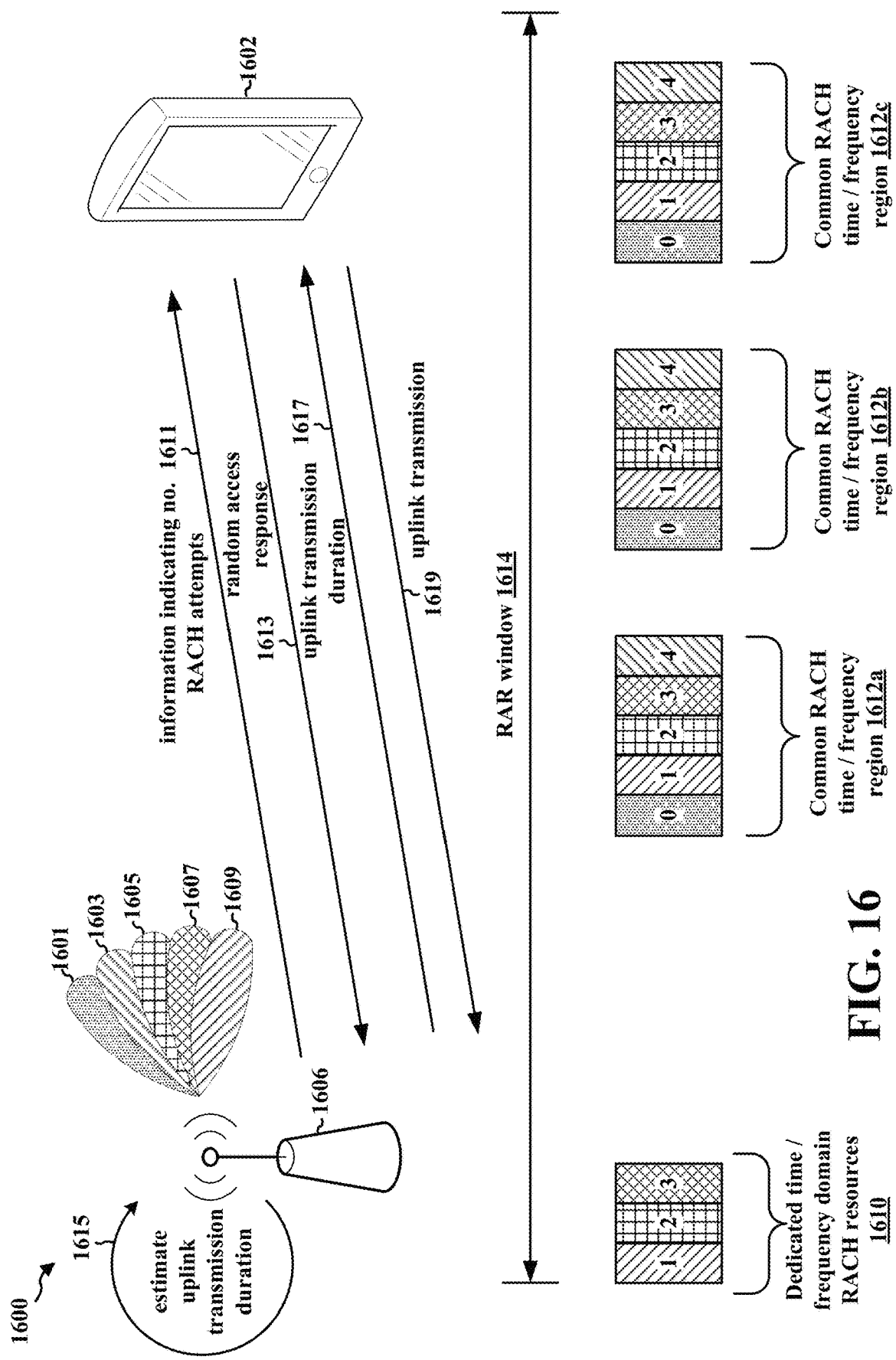
FIG. 16 is a diagram illustrating another example of combining RACH attempts to decode a RACH signal.

In certain configurations, one or more RACH attempts may be made performed before the expiration of a random access response (RAR) window (e.g., see FIG. 16).

At 1006, the UE may transmit the uplink message (e.g., the RACH Msg1 preamble) in the determined number of RACH attempts. In certain aspects, the UE may transmit the one or more RACH attempts in a resource corresponding to a same base station transmission beam. In certain other aspects, the UE may transmit each of the one or more RACH attempts in different resources corresponding to different base station transmission beams. In one configuration, the operations performed at 1006 may be the operations described above with reference to 410 of FIG. 4 or below with reference to FIG. 16.

In one configuration, the RACH signal may be a DRACH signal. In one configuration, the DRACH signal may be transmitted via the best beam selected from several beams received during a synchronization subframe. In one configuration, the DRACH signal may be transmitted at a transmission time when a base station receives signal using the best beam. The best beam may denote a beam whose corresponding reference signal, transmitted during a synchronization subframe (e.g., the synchronization subframe 500), is the strongest reference signal received at the UE among all possible beams. In one configuration, the transmission time for transmitting the DRACH signal may be denoted by a combination of one or more of a frame index, a subframe index, or a symbol index. In one configuration, the DRACH signal may be transmitted during the first available RACH attempt.

At 1008, the UE may receive, through a the random access response message from the base station, information regarding the duration of an uplink transmission. In one configuration, the operations performed at 1008 may be the operations described above with reference to 416 of FIG. 4.

At 1010, the UE may transmit the uplink message over the duration. In one configuration, the operations performed at 1010 may be the operations described above with reference to 422 of FIG. 4. In one configuration, the RACH Msg3 may be transmitted over a mini-slot, and the duration may be defined by the number symbols in the mini-slot.

Figure 11:
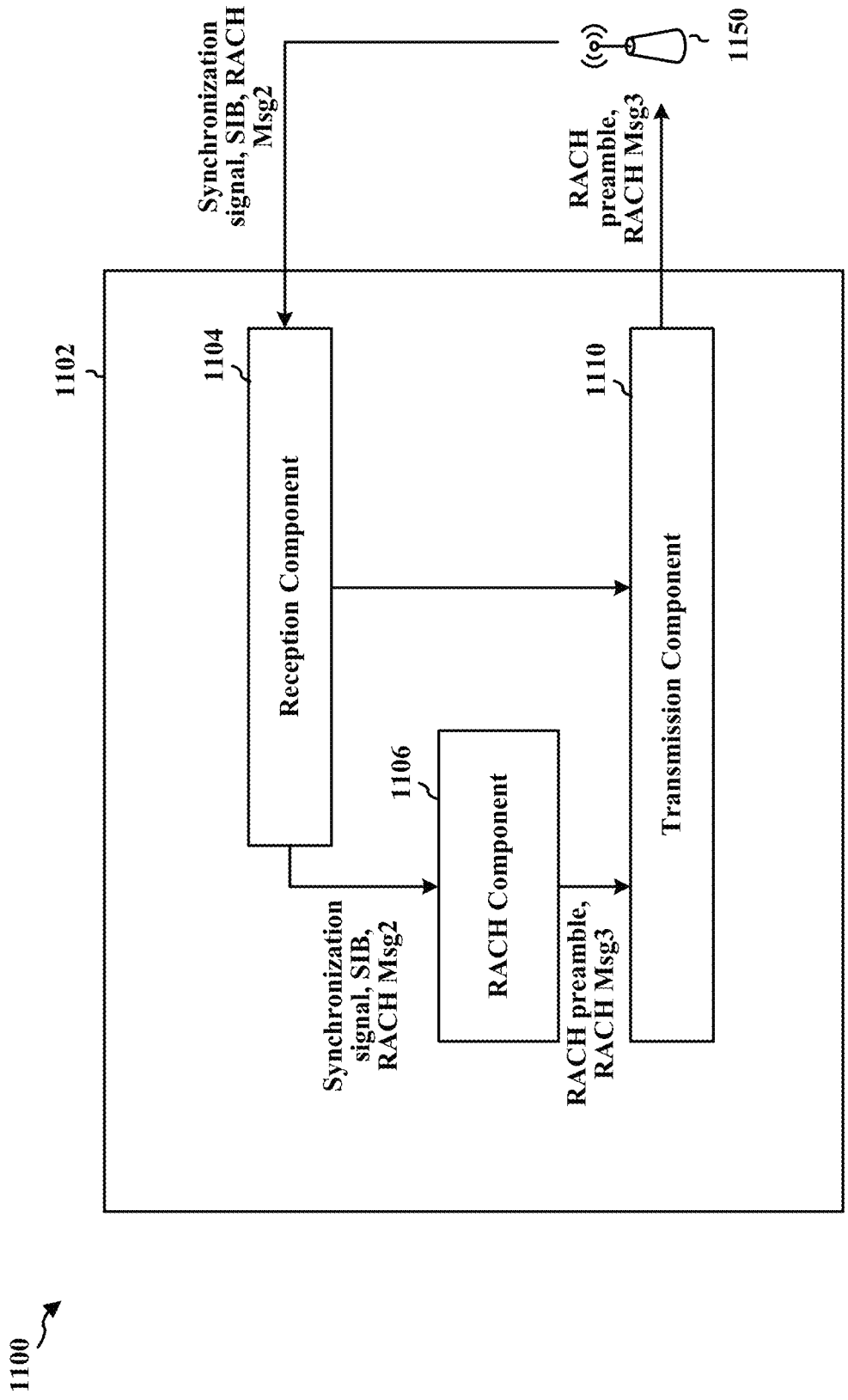
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE (e.g., the UE 104, 350, 402, 1450, 1602, the apparatus 1102') in communication with a base station 1150 (e.g., the base station 102, 180, 406, 1150, 1606, the eNB 310, the apparatus 1402/1402').

The apparatus 1102 may include a reception component 1104 that may be configured to receive a synchronization a signal, SIB, and/or a RACH Msg2 (e.g., the random access response message) from the base station 1150. In one configuration, the SIB may include the values of alpha and beta that enables the apparatus 1102 to determine the number of attempts for transmitting a RACH signal, as described above with reference to FIG. 4. In one configuration, the RACH Msg2 may include the duration of a RACH Msg3 (e.g., RRC connection request, tracking area update, or scheduling request). In one configuration, the reception component 1104 may be configured to perform operations described above with reference to 1008 of FIG. 10.

The apparatus 1102 may include a transmission component 1110 that may be configured to transmit a RACH signal (e.g., the RACH Msg1 preamble or RACH Msg3) to the base station 1150. In one configuration, the transmission component 1110 may be configured to perform operations described above with reference to 1006 or 1010 of FIG. 10. The reception component 1104 and the transmission component 1110 may cooperate with each other to coordinate the communications of the apparatus 1102.

The apparatus 1102 may include a RACH component 1106 that may be configured to determine the number of attempts for transmitting RACH signal and may be configured to generate the RACH signal. In one configuration, the RACH component 1106 may be configured to determine the number of attempts for transmitting RACH signal based on the synchronization signal and/or SIB received from the reception component 1104. In one configuration, the RACH component 1106 may be configured to perform operations described above with reference to 1002 and/or 1004 in FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
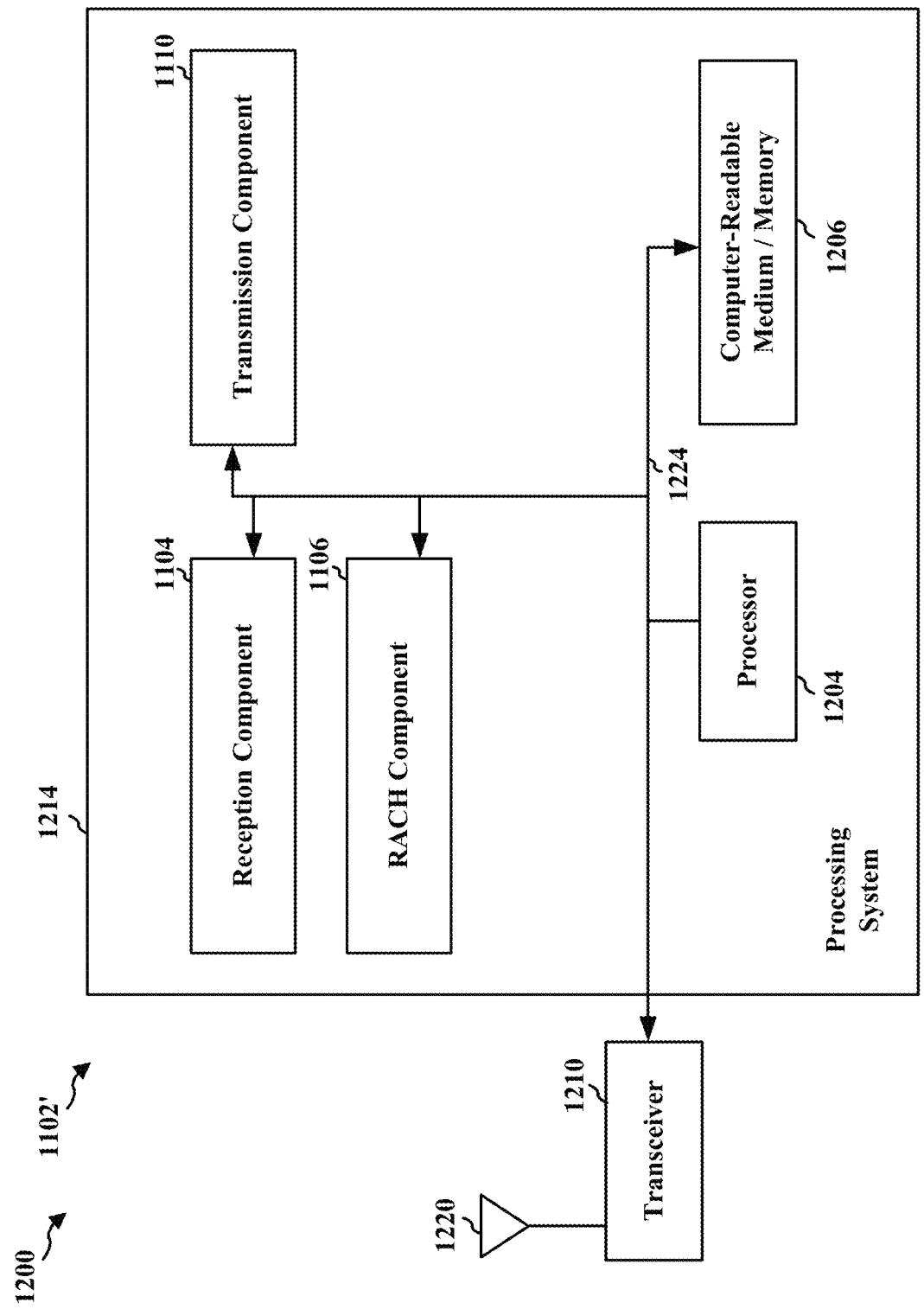
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1110, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1110. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication may include means for determining the number of attempts for a transmission of a RACH signal based on one or more of path loss, the transmit power of the UE, or the power of signals received during the synchronization subframe. In one configuration, the means for determining the number of attempts may perform operations described above with reference to 1004 of FIG. 10. In one configuration, the means for determining the number of attempts may be the RACH component 1106 or the processor 1204.

In one configuration, the apparatus 1102/1102' may include means for transmitting the RACH signal in the determined number of attempts. In one configuration, the means for transmitting the RACH signal in the determined number of attempts may perform operations descried above with reference to 1006 of FIG. 10. In one configuration, the means for transmitting the RACH signal in the determined number of attempts may be the one or more antennas 1220, the transceiver 1210, the transmission component 1110, or the processor 1204.

In one configuration, the apparatus 1102/1102' may include means for transmitting a RACH preamble to a base station in one or more attempts. In one configuration, the means for transmitting a RACH preamble to a base station in one or more attempts may perform operations descried above with reference to 1006 of FIG. 10. In one configuration, the means for transmitting a RACH preamble to a base station in one or more attempts may be the one or more antennas 1220, the transceiver 1210, the transmission component 1110, or the processor 1204.

In one configuration, the apparatus 1102/1102' may include means for receiving, through a random access response message from the base station, information regarding the duration of the uplink transmission. In one configuration, the means for receiving information regarding the duration of RACH Msg3 may perform operations descried above with reference to 1008 of FIG. 10. In one configuration, the means for receiving information regarding the duration of RACH Msg3 may be the one or more antennas 1220, the transceiver 1210, the reception component 1104, or the processor 1204.

In one configuration, the apparatus 1102/1102' may include means for transmitting the uplink transmission over the duration. In one configuration, the means for transmitting the uplink transmission over the duration may perform operations descried above with reference to 1010 of FIG. 10. In one configuration, the means for transmitting the uplink transmission over the duration may be the one or more antennas 1220, the transceiver 1210, the transmission component 1110, or the processor 1204.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
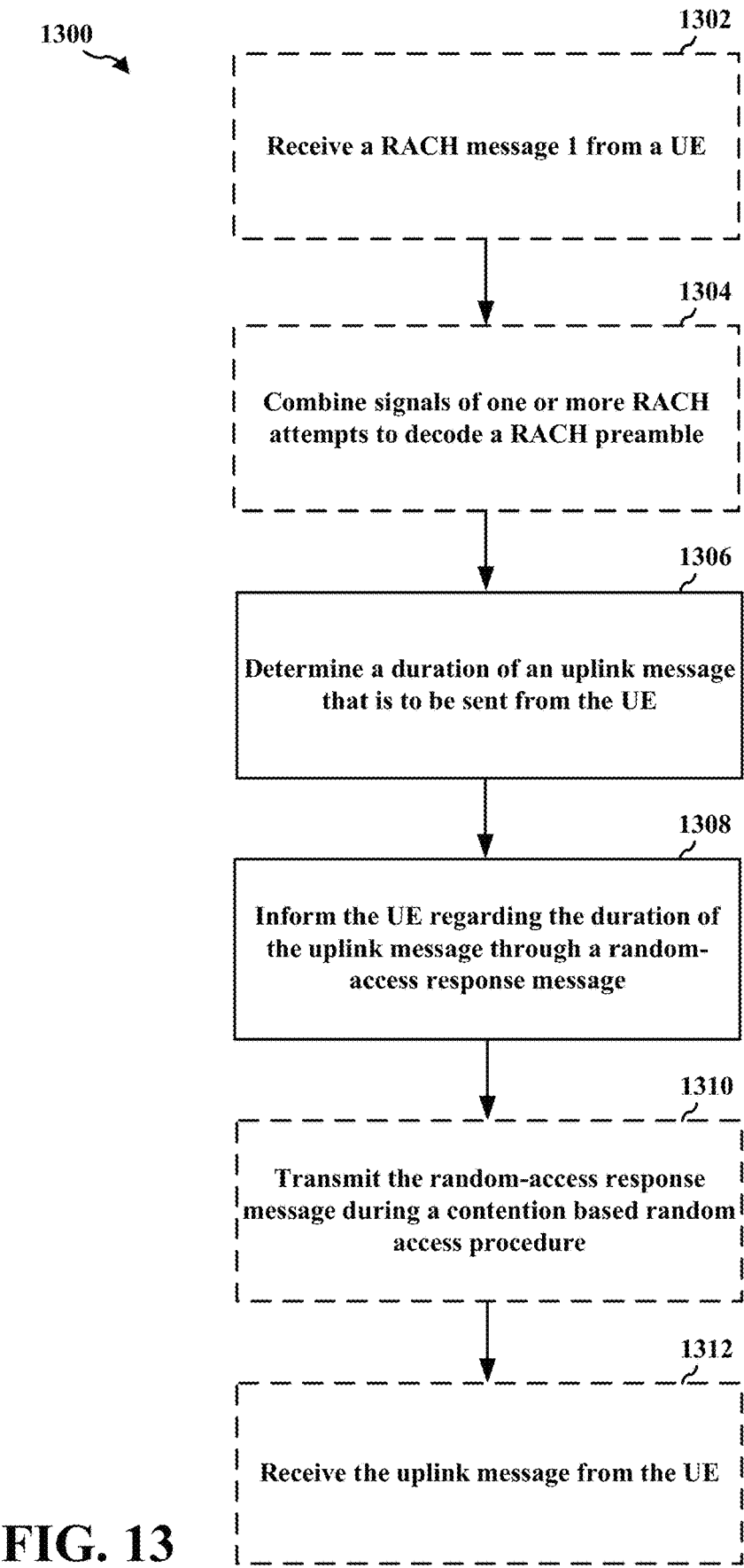
FIG. 13 is a flowchart of a method of wireless communication.

FIG. 13 is a flowchart 1300 of a method of wireless communication. The method may be performed by a base station (e.g., the base station 102, 180, 406, 1150, the eNB 310, the apparatus 1402/1402') in communication with at least one UE (e.g., the UE 104, 350, 402, 1450, the apparatus 1102/1102'). In FIG. 13, optional operations are indicated with dashed lines.

At 1302, the base station may receive a RACH message preamble (e.g., a RACH Msg1 preamble) from a UE. In one configuration, the operations performed at 1302 may be the operations described above with reference to 410 in FIG. 4 and/or the operations described below with reference to FIG. 16.

At 1304, the base station may combine signals of one or more RACH attempts to decode a RACH preamble. In one configuration, the operations performed at 1304 may be the operations described above with reference to 412 of FIG. 4. In one configuration, the operations performed at 1304 may be the operations described above with reference to FIG. 8, FIG. 9, or FIG. 16.

In one configuration, to combine the signals of one or more RACH attempts to detect the RACH signal, the base station may non-coherently add power of the signals of the one or more RACH attempts after correlating the signals of the one or more RACH attempts with the RACH preamble to obtain an equivalent signal that is detectable by the base station. In one configuration, non-coherently adding may mean the base station may combine the power of the correlated signals without the phase information of the correlated signals. In one configuration, non-coherently adding may mean adding the amplitude of the power of the correlated signals. In one configuration, the RACH signal may be a DRACH signal.

At 1306, the base station may determine the duration of an uplink transmission that is to be sent from a UE based on the number of RACH attempts that the base station uses for decoding the RACH preamble. In one configuration, the operations performed at 1306 may be the operations described above with reference to 414 of FIG. 4 and/or the operations described below with reference to FIG. 16. In one configuration, the uplink transmission may be transmitted over one or more mini-slots or one or more slots, and the duration may be defined by the number symbols in the one or more mini-slots or the one or more slots.

In one configuration, the mini-slot may include a first number of symbols when the base station uses one attempt to decode the RACH preamble, and the mini-slot may include a second number of symbols when the base station uses two attempts to decode the RACH preamble. In one configuration, the second number of symbols may be greater than the first number of symbols. In one configuration, the second number of symbols may be a multiple of the first number of symbols. In one configuration, the mini-slot may include a third number of symbols when the base station uses more than two attempts to decode the RACH preamble. In one configuration, the third number may be greater than the second number. In one configuration, the third number may be a multiple of the second number. In one configuration, the duration of the uplink transmission may be further determined based at least in part on a signal strength of the RACH preamble received from the UE.

At 1308, the base station may inform the UE, through a random access response, regarding the duration of the uplink transmission and/or inform the UE the number of RACH attempts to perform on the same transmission beam or different transmission beam to the base station. In one configuration, the operations performed at 1308 may be the operations described above with reference to 416 of FIG. 4 and/or the operations described below with reference to FIG. 16.

Figure 14:
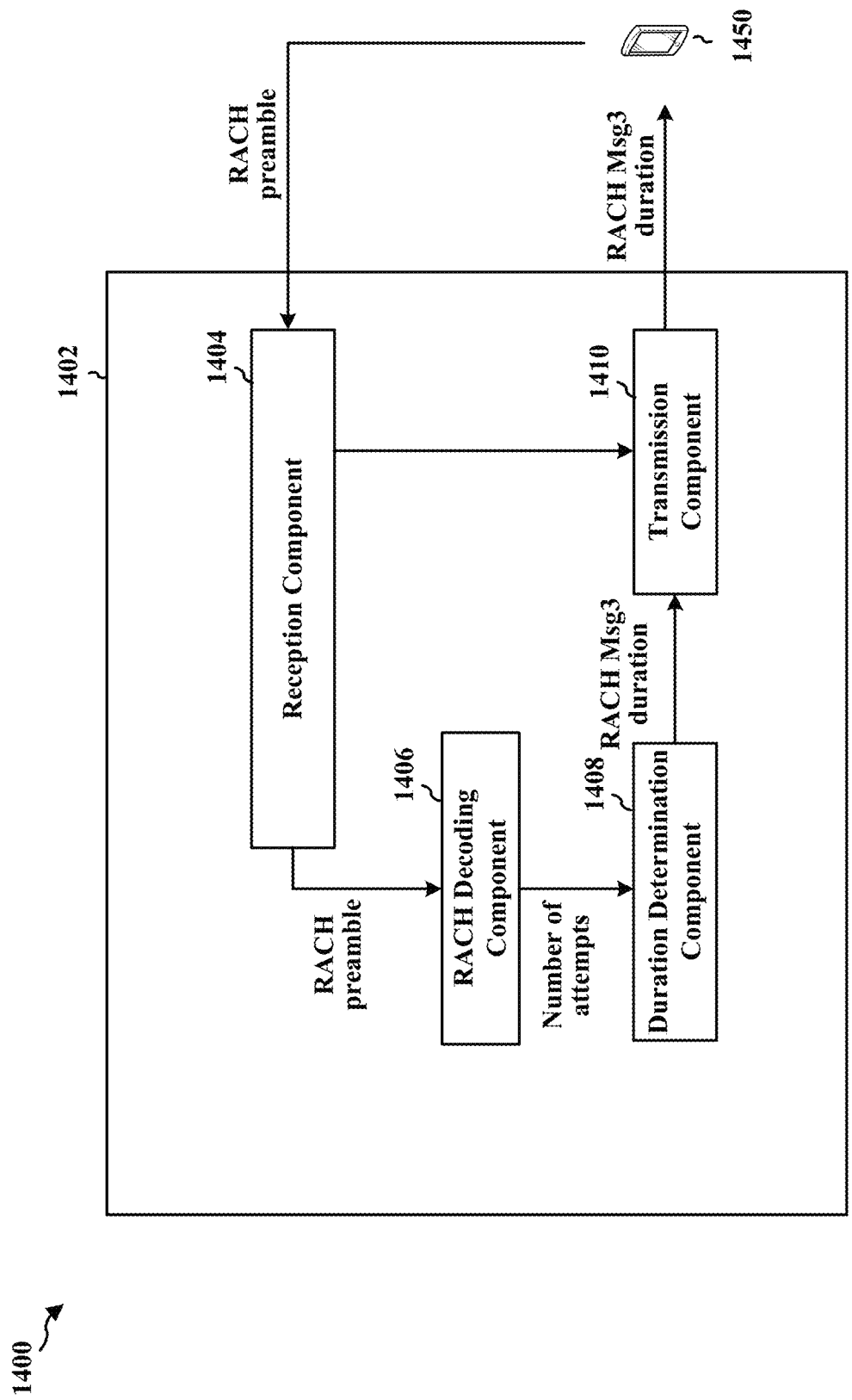
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a base station (e.g., the base station 102, 180, 406, 1150, 1606, the eNB 310, the apparatus 1402') in communication with a UE 1450 (e.g., the UE 104, 350, 402, 1602, the apparatus 1102/1102').

The apparatus 1402 may include a reception component 1404 that may be configured to receive a RACH preamble (e.g., RACH Msg1 preamble) from the UE 1450. The apparatus 1402 may include a transmission component 1410 that may be configured to transmit an uplink transmission duration to the UE 1450. In one configuration, the transmission component 1410 may perform operations described above with reference to 1306 of FIG. 13. The reception component 1404 and the transmission component 1410 may cooperate with each other to coordinate the communications of the apparatus 1402.

The apparatus 1402 may include a RACH decoding component 1406 that may be configured to decode a RACH preamble by combining signals of one or more RACH attempts. In one configuration, the RACH decoding component 1406 may be configured to perform operations described above with reference to 1302 of FIG. 13.

The apparatus 1402 may include a duration determination component 1408 that may be configured to receive information associated with the number of attempts for decoding the RACH preamble from the RACH decoding component 1406 and may be configured to determine the duration of RACH Msg3 based on the number of attempts. In one configuration, the duration of the RACH Msg3 may be further determined based at least in part on a signal strength of the RACH Msg1 received from the UE. In one configuration, the duration determination component 1408 may be configured to perform operations described above with reference to 1304 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
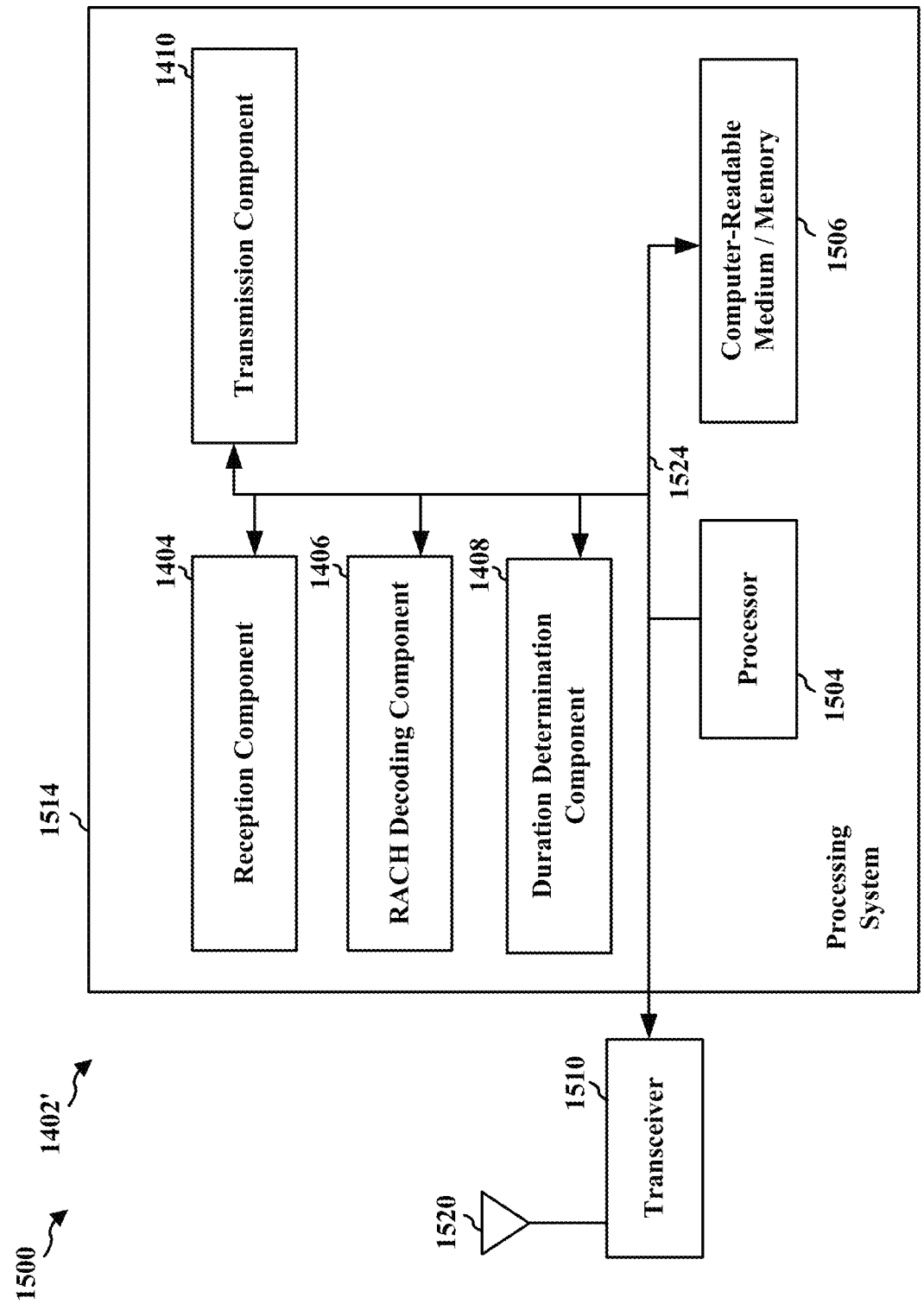
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410. The components may be software components running in the processor 1504, resident/stored in the computer readable medium/memory 1506, one or more hardware components coupled to the processor 1504, or some combination thereof. The processing system 1514 may be a component of the eNB 310 and may include the memory 376 and/or at least one of the TX processor 316, the RX processor 370, and the controller/processor 375.

In one configuration, the apparatus 1402/1402' for wireless communication may include means for combining signals of one or more RACH attempts to decode a RACH preamble. In one configuration, the means for combining signals of one or more RACH attempts to decode a RACH preamble may be configured to perform operations described above with reference to 1302 of FIG. 13. In one configuration, the means for combining signals of one or more RACH attempts to decode a RACH preamble may be the RACH decoding component 1406 or the processor 1504. In one configuration, the means for combining the signals of the one or more RACH attempts may be configured to non-coherently add power of the signals of the one or more RACH attempts.

In one configuration, the apparatus 1402/1402' may include means for informing the UE regarding the duration of the uplink transmission through a random access response message. In one configuration, the means for informing the UE regarding the duration of the uplink transmission through a random access response message may perform operations descried above with reference to 1306 of FIG. 13. In one configuration, the means for informing the UE regarding the duration of the uplink transmission through a random access response message may be the one or more antennas 1520, the transceiver 1510, the transmission component 1410, or the processor 1504.

In one configuration, the apparatus 1402/1402' may include means for determining a duration of an uplink transmission that is to be sent from a UE. In one configuration, the means for determining a duration of the uplink transmission that is to be sent from a UE may perform operations described above with reference to 1304 of FIG. 13. In one configuration, the means for determining a duration of the uplink transmission that is to be sent from a UE may be the duration determination component 1408 or the processor 1504.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

FIG. 16 is a diagram illustrating common time/frequency RACH resources and dedicated time domain RACH resources in a wireless communication system 1600 in accordance with certain aspects of the disclosure. In one configuration, the wireless communication system 1600 may be a mmW system. In the example illustrated in FIG. 16, the wireless communication system 400 includes a UE 1602 and a base station 1606. The UE 1602 may correspond to, e.g., UE 104, 350, 402, 1450, the apparatus 1102/1102'. The base station 1606 may correspond to, e.g., base station 102, 180, 606, 1150, the apparatus 1402/1402'.

In certain configurations, the base station 1606 may transmit through five beams 1601, 1603, 1605, 1607, 1609, and there may be five different resources 0, 1, 2, 3, 4 each corresponding to one of the five beams in the common time/frequency resource regions 1612a, 1612b, 1612c. The dedicated time/frequency domain RACH region 1610 may generate a set of resources (e.g., 1, 2, 3) corresponding to a subset of beams (e.g., 1603, 1605, 1607).

The common time/frequency domain RACH regions 1612a, 1612b, 1612c may each accommodate contention based random access (CBRA) procedures, and contention free random access (CFRA) procedures through dedicated preambles. The common time/frequency domain RACH regions 1612a, 1612b, 1612c may be similar to resources used in LTE (e.g., the preambles related to contention based random access), and the common time/frequency domain RACH regions 1612a, 1612b, 1612c may be shared by many UEs. The dedicated time/frequency domain RACH region 1610, on the other hand, may be available to only one UE (e.g., UE 1602).

The transmission power of a RACH transmission through common time/frequency domain RACH regions 1612a, 1612b, 1612c, and dedicated preamble indices within each common time/frequency domain RACH regions 1612a, 1612b, 1612c may be scaled so that different UEs RACH transmissions reach the base station 1606 at a similar power level (e.g., in order to ensure that a RACH transmission of one UE does not interfere with that of other UEs).

Since a UE 1602 scales uplink transmission power to meet a target received power at the base station 1606 while transmitting Msg1 through one or more of the common time/frequency domain RACH regions 1612a, 1612b, 1612c, the base station 1606 may be unable to estimate a UE's link gain from Msg1 reception.

However, in dedicated time/frequency domain RACH region 1610, the base station 1606 may schedule an entire set of RACH resources (e.g. all preamble indices) to one UE 1602 if a RACH load is reduced in the network. Hence, the base station 1606 may allow the UE 1602 to transmit CFRA in dedicated time/frequency domain RACH region 1610 with higher transmit power and convey more information through Msg1. As a result, the base station 1606 may be able to estimate the link gain of the UE 1602 based on Msg1 reception through the dedicated time/frequency domain RACH region 1610, and derive the duration for the first uplink transmission 1619 of the UE 1602 after receiving random access response 1613 (e.g., Msg1).

Typically, legacy RATs (e.g., LTE) allow one RACH attempt before the expiration of the RAR window 1614. For example, in FIG. 16, the base station 1606 may generate several opportunities (e.g., 1612a, 1612b, 1612c) that correspond to the base station's synchronization beams. However using a legacy RAT, the UE 1602 may only select one RACH resource among one of the common time/frequency domain RACH region 1612a, 1612b, 1612c before the expiration of RAR window 1614.

However, 5G NR may enable multiple Msg1, i.e., multiple RACH attempts, before the expiration of RAR window 1614. Hence, the UE 1602 may transmit Msg1 in at least one resource within each of the common time/frequency domain RACH region 1612a, 1612b, 1612c before the expiration of RAR window 1614. In certain configurations, the base station 1606 may transmit information 1611 indicating a number of RACH attempts the UE 1602 may perform before the expiration of the RAR window 614. If UE 1602 transmits each random access response (e.g., Msg1) with the same transmission beam (e.g., base station beam and/or UE beam), base station 1606 may combine the Msg1 transmission across each of the resources and detect Msg1. The number of attempts to decode Msg1 may enable the base station 1606 to estimate 1615 the resource duration for the uplink transmission 1619 (e.g., Msg3). The base station 1606 may transmit information 1617 indicating the uplink transmission duration to the UE 1602, and the UE 1602 may transmit the uplink transmission 1619 using the duration indicated by the base station 1606.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
   combining signals of one or more random-access channel (RACH) attempts from a user equipment (UE) to decode a RACH preamble;
   determining a duration of an uplink message that is to be sent from the UE based on a number of attempts the base station uses to decode the RACH preamble;
   informing the UE regarding the duration of the uplink message through a random-access response message; and
   receiving the uplink message from the UE, the uplink message being a RACH message 3, wherein the RACH message 3 is received over at least one mini-slot or at least one slot, and wherein the duration is defined by a number of symbols in the at least one mini-slot or the at least one slot.

2. The method of claim 1, further comprising:
   transmitting the random-access response message during a contention based random access procedure, the random-access response message being a RACH message 2.

3. The method of claim 2, further comprising:
   receiving a RACH message 1 from the UE,
      wherein the duration of the RACH message 3 that is to be sent from the UE is determined based at least in part of a signal strength of the RACH message 1 received from the UE.

4. The method of claim 1, wherein the RACH message 3 is transmitted over the at least one mini-slot, wherein the mini-slot comprises a first number of symbols when the base station uses one attempt to decode a RACH preamble, wherein the at least one mini-slot comprises a second number of symbols when the base station uses two attempts to decode the RACH preamble.

5. The method of claim 4, wherein the second number of symbols is greater than the first number of symbols.

6. The method of claim 4, wherein the second number of symbols is a multiple of the first number of symbols.

7. The method of claim 4, wherein the at least one mini-slot comprises a third number of symbols when the base station uses more than two attempts to decode the RACH preamble.

8. The method of claim 7, wherein the third number of symbols is greater than the second number of symbols.

9. The method of claim 7, wherein the third number of symbols is a multiple of the second number of symbols.

10. The method of claim 1, further comprising:
    transmitting the random-access response message during a contention-free random access procedure, the random-access response message being a random-access channel (RACH) message, the uplink message being a first uplink transmission received by the base station after transmitting the random-access response message.

11. The method of claim 1, wherein the one or more RACH attempts are performed before the expiration of random access response (RAR) window.

12. The method of claim 11, further comprising configuring the UE to transmit the one or more RACH attempts with a same UE transmission beam.

13. The method of claim 1, further comprising receiving the one or more RACH attempts in a resource corresponding to a same base station transmission beam.

14. The method of claim 1, further comprising receiving each of the one or more RACH attempts in different resources corresponding to different base station transmission beams.

15. A method of wireless communication of a user equipment (UE), comprising:
    transmitting a random-access channel (RACH) preamble to the base station in one or more attempts;
    receiving, through a random-access response message from a base station, information regarding a duration of an uplink message, the duration being determined based on a number of attempts the base station uses to decode the RACH preamble; and
    transmitting the uplink message over the duration, the uplink message being a RACH message 3, wherein the RACH message 3 is transmitted over at least one mini-slot or at least one slot, and wherein the duration is defined by a number of symbols in the at least one mini-slot or the at least one slot.

16. The method of claim 15, further comprising:
    receiving the random-access response message during a contention based random-access procedure, the random-access response message being a RACH message 2; and
    transmitting the uplink message from the UE.

17. The method of claim 15, further comprising:
    receiving the random-access response message during a contention-free random-access procedure; and
    transmitting the uplink message to the base station, the uplink message being a first uplink transmission transmitted after the random-access response message is received.

18. The method of claim 17, further comprising receiving information from the base station that configures the UE to transmit the one or more RACH attempts with a same UE transmission beam.

19. The method of claim 18, further comprising transmitting the one or more RACH attempts in a resource corresponding to a same base station transmission beam.

20. The method of claim 18, further comprising transmitting each of the one or more RACH attempts in different resources corresponding to different base station transmission beams.

21. An apparatus for wireless communication of a base station, comprising:
a memory; and
at least one processor coupled to the memory and configured to:
combining signals of one or more random-access channel (RACH) attempts from a user equipment (UE) to decode a RACH preamble;
determine a duration of an uplink message that is to be sent from the UE based on a number of attempts the base station uses to decode the RACH preamble;
inform the UE regarding the duration of the uplink message through a random-access response message;
transmit the random-access response message during a contention based random access procedure, the random-access response message being a random-access channel (RACH) message 2; and
receive the uplink message from the UE, the uplink message being a RACH message 3, wherein the RACH message 3 is transmitted over at least one mini-slot or at least one slot, and wherein the duration is defined by a number of symbols in the at least one mini-slot or the at least one slot.

22. The apparatus of claim 21, wherein the at least one processor is further configured to:
transmit the random-access response message during a contention-free random access procedure, the random-access response message being a random-access channel (RACH) message, the uplink message being a first uplink transmission received by the base station after transmitting the random-access response message.

23. An apparatus for wireless communication of a user equipment (UE), comprising:
a memory; and
at least one processor coupled to the memory and configured to:
transmit a random-access channel (RACH) preamble to the base station in one or more attempts;
receive, through a random-access response message from a base station, information regarding a duration of an uplink message, the duration being determined based on a number of attempts the base station uses to decode the RACH preamble; and
transmit the uplink message over the duration, the uplink message being a RACH message 3, wherein the RACH message 3 is transmitted over at least one mini-slot or at least one slot, and wherein the duration is defined by a number of symbols in the at least one mini-slot or the at least one slot.

24. The apparatus of claim 23, wherein the at least one processor is further configured to:
receive the random-access response message during a contention-free random-access procedure; and
transmit the uplink message to the base station, the uplink message being a first uplink transmission transmitted after the random-access response message is received.

* * * * *